June 19, 1945.  C. R. BINGHAM  2,378,460
VEHICLE HITCH
Filed Feb. 10, 1944   2 Sheets-Sheet 1

INVENTOR.
Charles Russell Bingham
BY Bush & Bush
His Attorneys

Patented June 19, 1945

2,378,460

UNITED STATES PATENT OFFICE 2,378,460

VEHICLE HITCH

Charles Russell Bingham, Davenport, Iowa

Application February 10, 1944, Serial No. 522,191

10 Claims. (Cl. 280—33.44)

My invention relates to vehicle hitches of the class described in co-pending application Serial No. 459,878, now Patent No. 2,350,579, issued June 6, 1944.

The objects of my invention are to provide a simplified form of hitch which will accomplish the same purposes as the hitch there described, with the additional advantage of having the point of attachment of the trailer to the rear axle of the tractor located close to the rear axle of the tractor and thus avoid a large part of the side draft or lateral pull which is exerted upon the rear axle of the tractor when the point of attachment of the trailer is located at a substantial distance behind the rear axle of the tractor; also to provide a hitch which will permit the tractor to turn so as to travel in a direction at right angles to the line of travel of the trailer as it reaches the turning point.

I accomplish these objects by the means illustrated in the accompanying drawings, in which—

Figure 1:
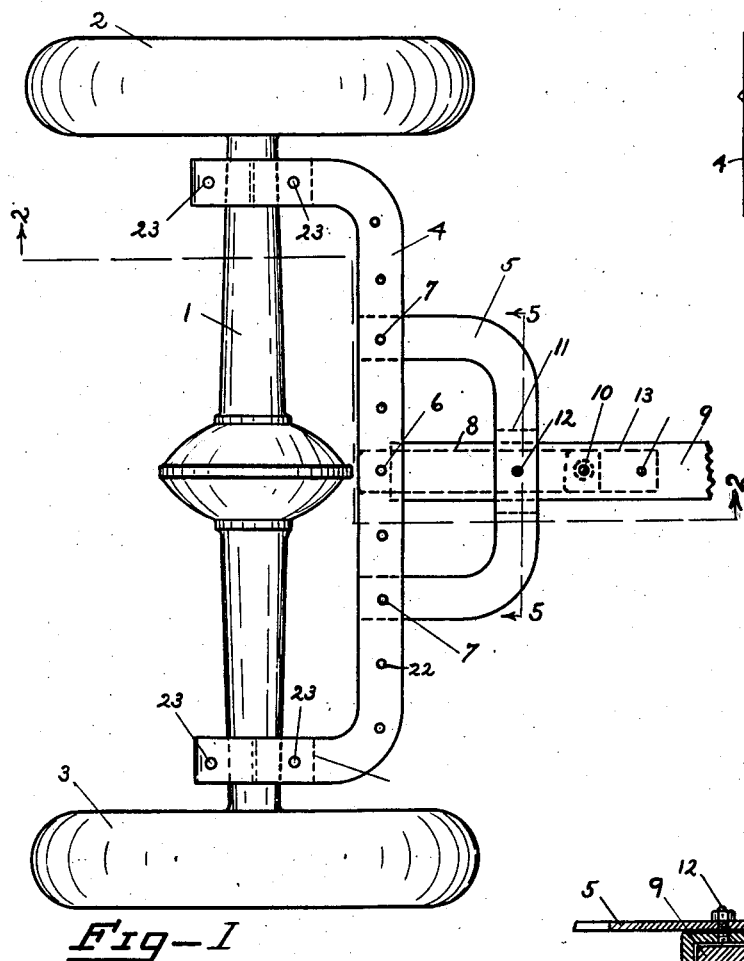
Figure 1 is a plan view of the rear axle of a tractor with my hitch attached thereto.

My apparatus is designed to hitch a plow, disc harrow, seeder, or other agricultural implement or a trailer vehicle to the rear axle of a suitable tractor. It consists of a yoke-bar or a pair of spaced yoke-bars 4—4.1 rigidly united to the rear axle 1 of a tractor by bolts 23 and blocks 27 or any other suitable means.

To the yoke-bars 4—4.1 I unite a pair of spaced U-bars 5—5.1 which extend to the rear a little farther than the rear wheels of the tractor. Bolts 7 or other suitable means may be used to secure the yokes and U-bars together and a plurality of spaced bores or openings 22 are formed in the yoke-bars so as to permit lateral adjustment of the U-bars thereon.

A pivot bolt 6 is mounted at the middle of the yoke-bars by which the front end of a drawbar 8 is pivotally attached to the yoke-bars. The rear end of the drawbar 8 is pivotally united to the tongue 9 of the trailer by a pivot bolt 10 spaced a predetermined distance to the rear of the front end of the tongue 9.

A supporting rectangular yoke or bracket 11 is pivotally mounted to the middle of the rear of the U-bars 5—5.1 through which the front end of the tongue 9 is passed and in which it is freely movable longitudinally. The drawbar 8, the front end of the tongue 9, and the yoke 11 are so positioned and spaced that the drawbar may swing laterally upon its pivot 6 to an angle approximately 45° without the front end of the tongue 9 becoming disengaged from the yoke 11.

The yoke 11 is pivotally mounted between the U-bars so as to turn freely as the tractor changes its direction. It may be pivoted to the U-bars by stud-bolts 12—12.1 or any other suitable means.

Figure 4:
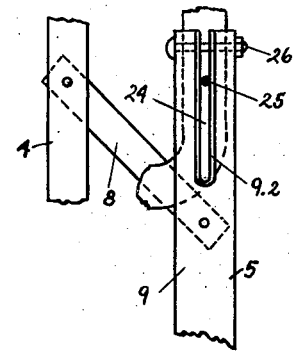
Figure 4 is a plan view of an alternate form for the front end of the tongue of a trailer and its connection to the U-bars.
Figure 5:
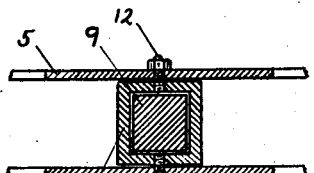
Figure 5 is a cross-sectional detail on the line 5—5 of Figure 1.
Figure 2:
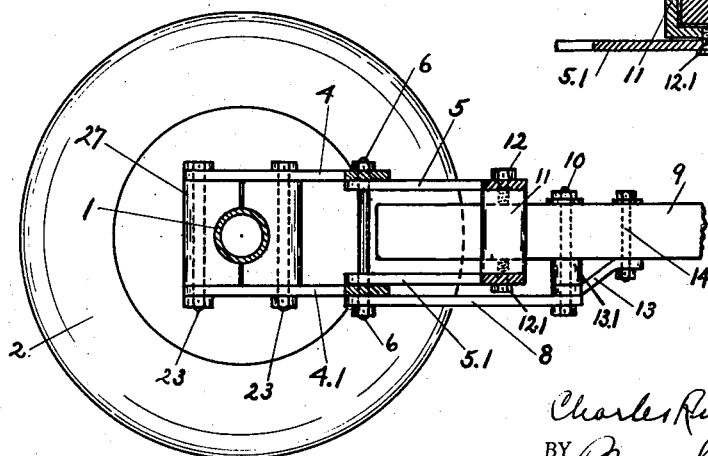
Figure 2 is a sectional elevation on the line 2—2 of Figure 1.

In Figure 4 I have shown an alternate form of slidably connecting the tongue to the rear of the U-bars in which the front end of the tongue 9 is provided with a vertical, longitudinal slot 24 whereby it may slide forwardly or backwardly on a bolt 25 rigidly secured to the U-bars as in Figure 4.

When so arranged, the slot 24 may be provided with a metal liner 9.2 to prevent wear and the tongue 9 may be strengthened by a transverse bolt 26 at its forward end.

In order to strengthen the attachment of the draw-bar 8 to the tongue 9, a metal bracket 13 may be bolted to the tongue by a bolt 14 and have its front end arranged to receive and reinforce the lower end of the pivot bolt 10.

A spacer 13.1 may be mounted upon the bolt 10 between the bracket 13 and the tongue 9 to keep the drawbar 8 clear of the U-bar 5.1.

In making and assembling my hitch, sufficient play should be provide between the tongue and the U-bars or brackets to accommodate the ordinary unevenness of plowed fields or highways.

In the operation of my hitch, the front end of the tongue of a vehicle will be inserted between the drawbars either within the bracket 11 or with its slot 24 riding the bolt 25, in case the slotted tongue is used.

Figure 3:
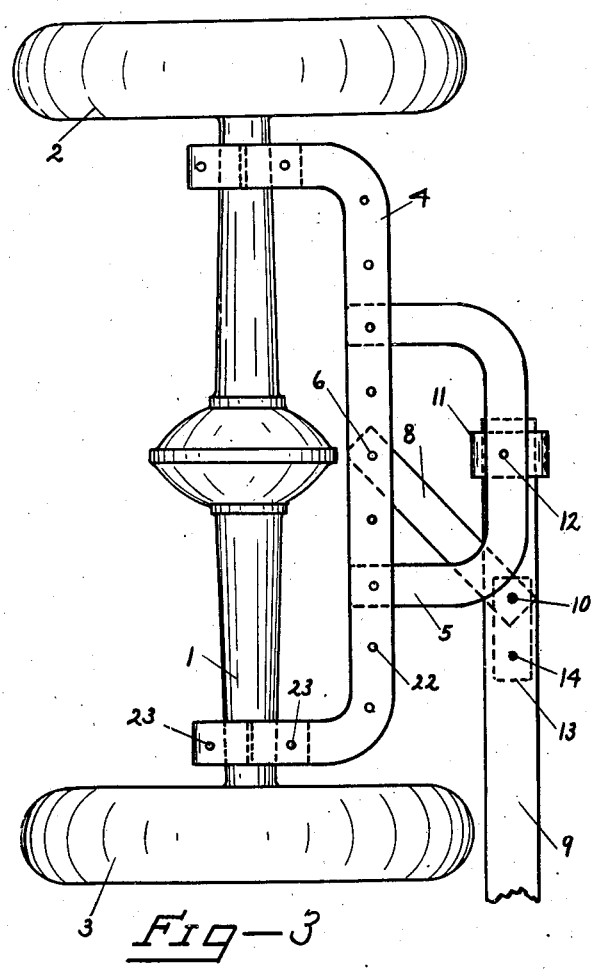
Figure 3 is a plan view of the apparatus shown in Figure 1 with the tractor turned at an angle of ninety degrees.

The rear end of the drawbar 8 will be pivoted upon the bolt 10 to the tongue. When the tractor is being driven directly forward, the tongue will stand in the position shown in Figure 1, but as the tractor is turned, the drawbar 8 will turn upon its pivot 6 moving laterally to an angle relative to its previous position, which angle will be determined by the extent to which the tractor is turned and the tractor may be turned to any extent up to a right angle from the direction it was previously traveling, without the tongue coming in contact with the rear wheels as shown in Fig. 3.

As the tractor is turned, the tongue 9 will move longitudinally to the rear relative to the yoke 11 or its pivot bolt 25, but cannot exert any lateral pull upon the U-bars. Thus this hitch will reduce the side pull and avoid the leverage which arises when the tongue is attached in such a way as to produce a lateral drag or side draft upon any fixed structure extending behind the rear wheels. My hitch may be built with a single yoke or a single U-bar, but the use of a pair of spaced yoke-bars and U-bars will afford greater strength and rigidity for a given weight.

For convenience of reference, I refer to the bars 4 and 4.1 as transverse bars or hitch-bars and to the bar 8 as a drawbar and to the bars 5 and 5.1 as U-bars.

The material, size and proportions of the various parts of my hitch may be varied to suit the requirements of different cases without departing from the spirit of my invention and I do not limit my claims to the precise forms shown in the drawings which are to be regarded as illustrative rather than limiting the apparatus to the precise forms illustrated.

I claim:

1. A tractor-trailer hitch comprising a hitch-bar rigidly united to the rear axle of the tractor parallel with and close to the rear axle, a U-bar with its arms mounted upon the hitch-bar and extending rearwardly therefrom, a yoke pivotally united to the middle portion of the U-bar to adjustably receive and guide the front end of the tongue of the trailer arranged to slide longitudinally in the yoke, and a drawbar having its front end pivotally united to the hitch-bar and its rear end pivotally united to the tongue of the trailer at a point spaced to the rear of the end of the tongue.

2. A tractor-trailer hitch comprising a hitch-bar rigidly united to the rear axle of the tractor parallel with and close to the rear axle, a U-bar with its arms mounted upon the hitch-bar and extending rearwardly therefrom, a yoke pivotally united to the middle portion of the U-bar to adjustably receive and guide the front end of the tongue of the trailer arranged to slide longitudinally in the yoke, and a drawbar having its front end pivotally united to the hitch-bar and its rear end pivotally united to the tongue of the trailer at a point spaced to the rear of the end of the tongue, all so proportioned and arranged that the tractor may be turned to either right or left at a right angle to its previous line of travel without causing the tongue to contact the rear wheels of the tractor.

3. A tractor-trailer hitch comprising a pair of spaced transverse bars rigidly united to the rear axle of the tractor parallel with and close to the rear axle, a pair of U-bars with their arms mounted upon the transverse bars and extending rearwardly therefrom, a yoke pivotally united to the middle portion of the U-bars to adjustably receive and guide the front end of the tongue of the trailer arranged to slide longitudinally in the yoke, a drawbar having its front end pivotally united to the transverse bar and its rear end pivotally united to the tongue of the trailer at a point spaced to the rear of the end of the tongue, so proportioned and arranged that the tractor may be turned to either right or left at a right angle to its previous line of travel without causing the tongue to contact the rear wheels of the tractor.

4. A tractor-trailer hitch comprising a pair of spaced transverse bars rigidly united to the rear axle of the tractor parallel with and close to the rear axle, a pair of U-bars with their arms mounted upon the transverse bars and extending rearwardly therefrom, a yoke pivotally united to the middle portion of the U-bars to adjustably receive and guide the front end of the tongue of the trailer arranged to slide longitudinally in the yoke, a drawbar having its front end pivotally united to the transverse bar and its rear end pivotally united to the tongue of the trailer at a point spaced to the rear of the end of the tongue, so proportioned and arranged that the tractor may be turned to either right or left at a right angle to its previous line of travel without causing the tongue to contact the rear wheels of the tractor and without the tongue exerting side draft upon the U-bars.

5. A tractor-trailer hitch comprising a transverse bar rigidly united to the rear axle of the tractor parallel with and close to the rear axle, a U-bar with its arms mounted upon the transverse bar and extending rearwardly therefrom, a yoke pivotally united to the middle portion of the U-bar to adjustably receive and guide the front end of the tongue of the trailer arranged to slide longitudinally in the yoke, a drawbar having its front end pivotally united to the transverse bar and its rear end pivotally united to the tongue of the trailer at a point spaced to the rear of the end of the tongue, so proportioned and arranged that the tractor may be turned to either right or left at a right angle to its previous line of travel without causing the tongue to contact the rear wheels of the tractor and without the tongue exerting side draft upon the U-bar.

6. In a trailer-tractor hitch, the combination with a hitch-bar rigidly united to the rear axle of the tractor parallel with and close to the rear axle, of a U-bar with its arms mounted upon the hitch-bar and extending rearwardly therefrom, a yoke pivotally united to the middle portion of the U-bar to adjustably receive and guide the front end of the tongue of the trailer arranged to slide longitudinally in the yoke, and a drawbar having its front end pivotally united to the hitch-bar and its rear end pivotally united to the tongue of the trailer at a point spaced to the rear of the end of the tongue.

7. In a trailer-tractor hitch, the combination with a pair of spaced transverse bars rigidly united to the rear axle of the tractor parallel with and close to the rear axle, of a pair of U-bars with their arms mounted upon the transverse bars and extending rearwardly therefrom, a yoke pivotally united to the middle portion of the U-bars to adjustably receive and guide the front end of the tongue of the trailer arranged to slide longitudinally in the yoke, a drawbar having its front end pivotally united to the transverse bar and its rear end pivotally united to the tongue of the trailer at a point spaced to the rear of the end of the tongue, so proportioned and arranged that the tractor may be turned to either right or left at a right angle to its previous line of travel without causing the tongue to contact the rear wheels of the tractor.

8. A tractor-trailer hitch comprising a hitch-bar rigidly united to the rear axle of the tractor parallel with and close to the rear axle, a U-bar with its arms adjustably mounted upon the hitch-bar and extending rearwardly therefrom, a yoke pivotally united to the middle portion of the U-bar to adjustably receive and guide the front end of the tongue of the trailer arranged to slide longitudinally in the yoke, and a drawbar having its front end pivotally united to the hitch-bar and its rear end pivotally united to the tongue of the trailer at a point spaced to the rear of the end of the tongue.

9. A tractor-trailer hitch comprising a pair of spaced transverse bars rigidly united to the rear axle of the tractor parallel with and close to the rear axle, a pair of U-bars with their arms adjustably mounted upon the transverse bars and extending rearwardly therefrom, a yoke pivotally united to the middle portion of the U-bars to adjustably receive and guide the front end of the tongue of the trailer arranged to slide longitudinally in the yoke, a drawbar having its front end pivotally united to the transverse bar and its rear end pivotally united to the tongue of the trailer at a point spaced to the rear of the end of the tongue, so proportioned and arranged that the tractor may be turned to either right or left at a right angle to its previous line of travel without causing the tongue to contact the rear wheels of the tractor.

10. In a trailer-tractor hitch, the combination with a hitch-bar rigidly united to the rear axle of the tractor parallel with and close to the rear axle, of a U-bar with its arms adjustably mounted upon the hitch-bar and extending rearwardly therefrom, a yoke pivotally united to the middle portion of the U-bar to adjustably receive and guide the front end of the tongue of the trailer arranged to slide longitudinally in the yoke, and a drawbar having its front end pivotally united to the hitch-bar and its rear end pivotally united to the tongue of the trailer at a point spaced to the rear of the end of the tongue.

CHARLES RUSSELL BINGHAM.